United States Patent [19]
Roske

[11] Patent Number: 5,300,762
[45] Date of Patent: Apr. 5, 1994

[54] NON-CONTACT SHOE FOR BAR CODE WANDS

[75] Inventor: Robert L. Roske, Richland, Wash.

[73] Assignee: Siemens Power Corporation, Richland, Wash.

[21] Appl. No.: 904,352

[22] Filed: Jun. 25, 1992

[51] Int. Cl.⁵ .............................................. G06K 7/10
[52] U.S. Cl. .................................................. 235/472
[58] Field of Search ........................ 235/495, 486, 472

[56] References Cited

U.S. PATENT DOCUMENTS

| | | | |
|---|---|---|---|
| 3,711,723 | 1/1973 | McMurtry | 235/472 |
| 3,976,973 | 8/1976 | Martin et al. | 235/472 |
| 4,098,490 | 10/1987 | Nakase et al. | 235/472 |
| 4,263,503 | 4/1981 | Bianco | 235/487 |
| 4,288,690 | 9/1981 | Sanner | 250/216 |
| 4,460,120 | 7/1984 | Shepard et al. | 235/472 |
| 4,736,095 | 4/1988 | Shepard et al. | 235/472 |
| 4,748,319 | 5/1988 | Sasaki et al. | 235/472 |
| 4,833,306 | 5/1989 | Milbrett | 235/375 |
| 4,845,350 | 7/1989 | Shepard et al. | 235/472 |
| 4,866,258 | 9/1989 | Ueda et al. | 235/472 |
| 5,004,898 | 4/1991 | Ihsikawa | 235/486 |
| 5,047,625 | 9/1991 | Iima et al. | 235/472 |

FOREIGN PATENT DOCUMENTS

3109296 9/1982 Fed. Rep. of Germany ...... 235/472

OTHER PUBLICATIONS

IBM Technical Disclosure Bulletin May 1969 vol. 11 No. 12 Montedonico.
IBM Technical Disclosure Bulletin Mar. 1978 vol. 20 Minor and Sedaris.

Primary Examiner—Davis L. Willis
Assistant Examiner—Karl Frech
Attorney, Agent, or Firm—Ira Lee Zebrak

[57] ABSTRACT

A shoe for a bar code wand consists of an upper cylindrical portion having a through hole for receiving and frictionally engaging a portion of the scanning head of the wand, a downwardly sloping inwardly converging shoulder located within the hole near the bottom of the cylindrical portion serving to limit the extent of penetration of the wand into the hole, and a pair of parallel opposing contact arms extending downward from the bottom of the cylindrical portion, for providing a predetermined gap between the reading tip of the wand and a bar code label. The ends of the contact arms are radiused to permit angular movement within a range of the wand from perpendicular orientation with a bar code label being read by moving the assembly of the wand and shoe across the label, while maintaining the desired gap.

6 Claims, 2 Drawing Sheets

NON-CONTACT SHOE FOR BAR CODE WANDS

FIELD OF THE INVENTION

This invention relates generally to bar code apparatus, and more specifically to devices for preventing contact between the tip of a bar code wand and a bar code label.

BACKGROUND OF THE INVENTION

Bar coded labels have been used for many years for providing coding of goods to convey desired information, such as the contents of a container, the price of the goods, origin of the goods, and so forth. A variety of equipment has been developed for reading bar code labels. An inexpensive bar code reader is provided by bar code wands. Typically, such wands have a pencil-shaped holder for housing associated electronics, illumination and light detector devices. The tip of such a wand is typically provided by a rounded jewel element. In use, the wand is positioned for wiping the jewel tip across the bar code label, for detecting the bar code as a sequence of electrical signals, for processing. Bar code labels that are repeatedly read vary in their resistance to contact damage from the jewel tip of the bar code wands. In certain applications, the environment in which a bar code label is to be used may restrict the selection of label material to materials that are subject to damage from repeated contact scanning via a bar code wand. Ceramic labels must be used in applications exposing a bar code label to high temperatures. Although ceramic labels are useful in such high temperature applications, and can withstand any outgasing in the environment, such labels are prohibitively expensive. Attempts to use metal labels in such applications, and even in less demanding applications, have shown that such labels sustain damage to the bar code printing thereon from repeated bar code wand scans by contact with the jewel tipped heads of such wands.

Non-contact beam scanners have been developed for overcoming the problems associated with contact bar code wands in reading bar coded labels. However, such scanners as laser beam scanners, typically cost more than ten times the cost of bar code wands. Accordingly, the high cost of such laser beam scanners tends to reduce the overall economies obtained from being able to use metal bar code labels without damage by repeated scans via non-contact beam scanners. Such non-contact laser beam scanners are disclosed in Shepard et al. U.S. Pat. Nos. 4,460,120; 4,736,095; 4,845,350, respectively, for example.

Other attempts have been made in the art to provide devices for protecting bar code labels. For example, Bianco U.S. Pat. No. 4,263,503, shows the use of a plate mounted over a bar code label or bar coded area on an object, with the plate having an elongated slot therethrough for exposing a sufficient portion of the bar code. The width of the slot permits a bar code wand to be wiped across the slot without touching the label, but in close enough contact to the label for reading the bar code.

Milbrett U.S. Pat. No. 4,833,306, shows another device for protecting bar code labels or tags. In this patent, a bar code tag is encapsulated beneath a transparent window of a bar code carrier attached to an associated object. In this manner, the bar code tag is protected from harsh chemical environments, but can still be read through the transparent cover by an associated bar code reader.

Sanner U.S. Pat. No. 4,288,690, shows an optical character reader consisting of a hand-held scan head 10, that is provided with a detachable illuminator 12. The illuminator 12 includes a pair of opposing light bulbs mounted in a top portion thereof on either side of an open slot 12b. The light from the light bulbs is reflected along interior downward converging side portions to exit from a truncated tip portion of the illuminator 12. A notch is cut through the tip for permitting a user to more easily position the scanner 10 over characters to be read by moving the scanner along a row of such characters. The light from the illuminator 12 is reflected back from the characters through the topmost central slot of the illuminator 12, to focusing lenses 17, for focusing the detected light upon a light sensor array 16.

The present inventor recognized the need for a relatively inexpensive device for permitting typical bar code wands to be used for reading bar codes on metal labels, for example, without damaging the bar code label. The present inventor further recognized that such a device must be very inexpensive, and adaptable for use with a variety of standard bar code wands.

SUMMARY OF THE INVENTION

An object of the present invention is to provide a device for protecting bar code labels from damage due to repeated reading via a bar code wand.

Another object of the invention is to provide a device adaptable for use with a plurality of typical bar code wands, for permitting such wands to be moved across a bar code label in close proximity thereto without actually touching the label, for thereby preventing damage to the bar coded information on the label.

These and other objects of the invention to overcome the problems in the prior art, and to satisfy the identified need, are provided in one embodiment of the invention by a "shoe" including holder means for receiving a portion of the tip end of a bar code wand, and non-contact means for permitting the combination of the shoe and bar code wand to be wiped over a bar code portion of a bar coded label, for example, in a manner preventing the typical jewel tip of the bar code wand from actually contacting the bar code label, but passing in close enough proximity thereto to facilitate reading of the bar code label.

BRIEF DESCRIPTION OF THE DRAWINGS

Various embodiments of the present invention are illustrated below in conjunction with the accompanying drawings, wherein like items are identified by the same reference designation, and in which.

DETAILED DESCRIPTION OF PREFERRED EMBODIMENTS OF THE INVENTION

Figure 1:
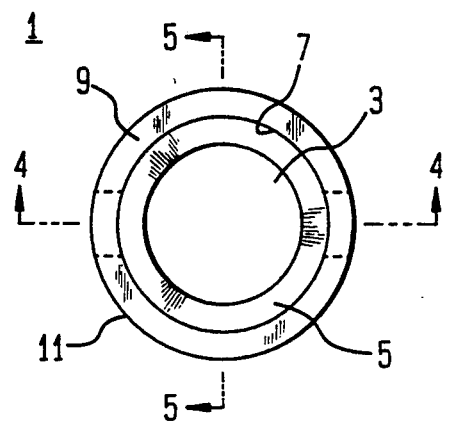
FIG. 1 is a top plane view of one embodiment of the invention.
Figure 2:
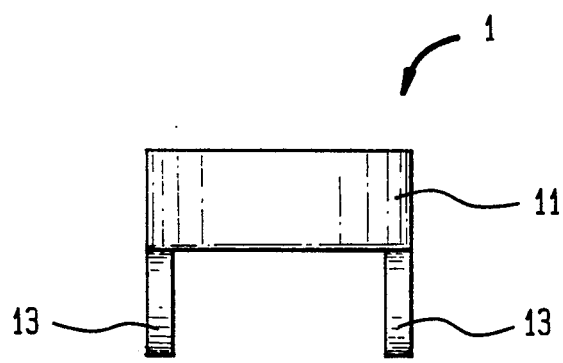
FIG. 2 is a front elevational view of the one embodiment of the invention, the rear elevational view being identical thereto.
Figure 3:
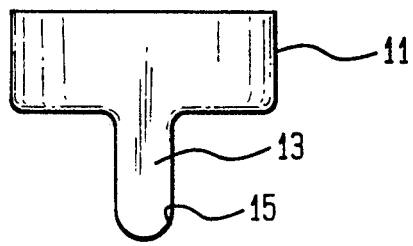
FIG. 3 is a side elevational view of the one embodiment of the invention, the elevational view of the opposite side being identical thereto.
Figure 4:
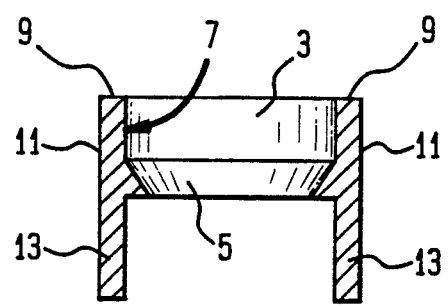
FIG. 4 is a cross-sectional view taken along 4—4 of FIG. 1.
Figure 5:
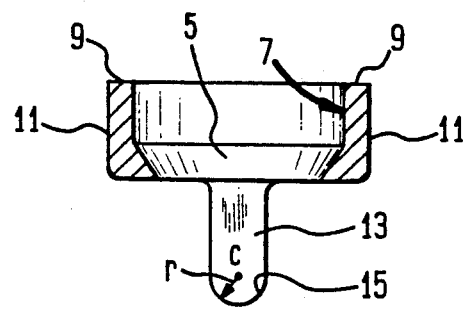
FIG. 5 is a cross-sectional view taken along 5—5 of FIG. 1.

The non-contact shoe 1 for bar code wands for one embodiment of the present invention, as shown in FIGS. 1 through 7, includes a central through hole 3, concentric with a downwardly tapering and inwardly converging band-like lip portion 5 projecting from an interior portion of the inside surface 7, of an outer wall 9 having an exterior surface portion 11. As shown in FIG. 2, the "shoe" or spacer 1 also includes a pair of opposing lower contact arms 13, for contacting portions of a bar code label above and below the bar code information imprinted thereon, as will be explained below. Note in FIG. 3, that the two, lower contact arms 13 terminate at their lowermost ends in rounded tips 15 for providing angular freedom between a label surface in a bar code wand associated therewith, while still maintaining gap control between the tip of the wand and the label. For example, with reference to FIGS. 5 and 7, rounded tips 15, having an arc of 0.06 radians projected by a radian r centered at C, provides an angular freedom for a bar code wand of about plus or minus 30° from a perpendicular orientation with the label.

Figure 6:
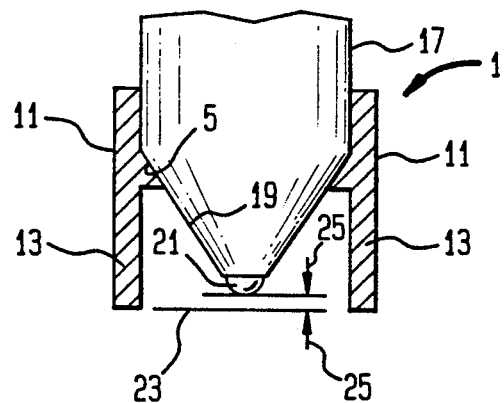
FIG. 6 is a partial cross-sectional view of FIG. 4 showing a bar code wand positioned in the "shoe" device of the one embodiment of the invention.
Figure 7:
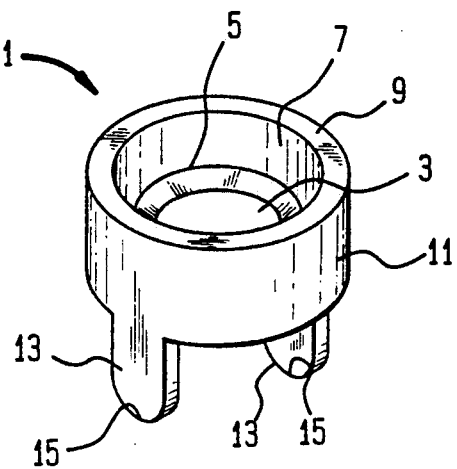
FIG. 7 is a pictorial view from the top left side of the one embodiment of the invention.

As shown in FIG. 6, a typical bar code wand 17 includes at one end a truncated conically shaped scanning head 19 with a jeweled reading tip 21. The spacer or shoe 1 is dimensioned for providing that the upper portion of the conically shaped reading head 19 rests against the downwardly sloping lip 5, with the spacer 1 being frictionally secured to the bar code wand 17 in the preferred embodiment, via the diameter of interior side wall portions being made slightly smaller than the outside diameter of wand 17, for example. The jewel tip 21 is held about 0.005 inch minimum to 0.020 inch maximum, for example, above the bar coded portion of a bar code label 23. The gap x between the jewel tip 21 and label 23 is represented by the distance between arrows 25, in this illustration.

The spacer or non-contact shoe 1 can be dimensioned to accommodate bar code wands of differing dimensions, as required for a particular application. Also, the spacer 1, in the preferred embodiment, consists of a structurally stable self-lubricating material, such as Nylon, Delrin, HDPE, and other such standard plastic materials. If the spacer or non-contact shoe 1 wears particularly about the rounded tips 15 of the opposing respective contact arms 13, reducing the gap 25 to below 0.005 inch, for example, the spacer 1 is easily replaced by a new spacer for restoring the gap.

In an engineering prototype of shoe 1, for use with an HBCS6300 bar code wand (manufactured by Hewlet-Packard Co.), the diameter of the inside circular wall 7 was 0.52 inch, and the diameter of the outside circular wall portion 11 was 0.625 inch. Also, the width of wall portion 11 was 0.25 inch, and the length of each contact arm was 0.25 inch. The slope of lip or shoulder 5 was about 70° from the horizontal. Shoulder 5 serves as a stop for limiting penetration of the wand 17 into shoe 1. In the prototype, the gap 70 ranged from 0.005 to 0.020 inch, depending upon the angle of the wand 17 and shoe 1 assembly to the bar code label being scanned.

Although various embodiments of the invention have been illustrated and described herein, they are not meant to be limiting. Those skilled in the art may recognize modifications to these various embodiments, which modifications are meant to be covered by the spirit and scope of the appended claims.

What is claimed is:

1. A non-contact spacer shoe device for fitting over the scanning head of a handheld bar code wand for spacing a reading tip of the scanning head out of direct contact with a bar code label to be read, said shoe device comprising:
   an upper cylindrical housing of short length including:
   a centrally located through hole;
   a top circular edge surrounding said through hole;
   a bottom circular edge portion;
   said through hole being dimensioned for providing a frictional fit with side walls of said scanning head upon which said shoe device is mounted;
   a lower portion of an interior wall forming the circumference of said through hole converging inward toward the longitudinal axis of said housing, for forming a tapered shoulder serving as a stop mechanism for limiting the extent to which said spacer shoe device can be pushed over said scanning head;
   said tapered shoulder portion terminating at said bottom edge portion, and causing said bottom edge portion to be of greater width than said top edge; and
   first and second contact arms extending downward from opposite sides of the bottom of said upper cylindrical housing, said contact arms being parallel to one another, with a distance therebetween greater than the width of sensitive bar coded areas of a bar code label to be read, the length of said first and second contact arms being predetermined for providing a desired gap between the reading tip of the associated said bar code wand and a bar code label.

2. The spacer shoe device of claim 1, wherein the angle of taper of said shoulder corresponds to the taper of an associated said scanning head of said bar code wand, for providing substantial contact therebetween.

3. The spacer shoe device of claim 1, wherein the ends of each of said first and second contact arms are rounded for permitting a range of angular movement of said bar code wand away from a perpendicular orientation with a bar code label, while maintaining a desired gap between said reading tip of said bar code wand and said bar code label, as said bar code wand is moved across said bar code label.

4. The spacer shoe device of claim 3, wherein the rounded ends of said first and second contact arms describe an arc of 0.06 radians projected by a radius having a center of reference along the longitudinal axes thereof, respectively, for providing a range of angular movement of plus or minus 30° away from the perpendicular.

5. The spacer shoe device of claim 1, wherein said cylindrical portion, said stop mechanism, and said first and second contact arms consist of plastic material.

6. The spacer shoe device of claim 1, wherein said spacer shoe device consists of a single piece of plastic material.

* * * * *